(12) United States Patent
Vaughan

(10) Patent No.: US 6,402,944 B1
(45) Date of Patent: Jun. 11, 2002

(54) WATER SOFTENER CONTROL VALVE WITH REMOVABLE SEAL STACK

(75) Inventor: Don Vaughan, Brookfield, WI (US)

(73) Assignee: Clack Corporation, Windsor, WI (US)

( * ) Notice: Subject to any disclaimer, the term of this patent is extended or adjusted under 35 U.S.C. 154(b) by 0 days.

(21) Appl. No.: 09/667,761

(22) Filed: Sep. 21, 2000

(51) Int. Cl.$^7$ .............................. C02F 5/00; F16J 15/56
(52) U.S. Cl. .................. 210/190; 137/597; 137/625.69; 137/624.48; 277/353; 210/140; 210/269
(58) Field of Search ................................ 210/139, 140, 210/190, 269, 275; 137/597, 599.11, 625.29, 625.69, 624.48; 251/324, 325; 277/346, 353, 437

(56) References Cited

U.S. PATENT DOCUMENTS

| | | |
|---|---|---|
| 2,962,437 A | 11/1960 | Lindsay |
| 3,249,122 A | 5/1966 | Fleckenstein et al. |
| 3,441,047 A | 4/1969 | Lyall et al. |
| 3,480,041 A | 11/1969 | Whitlock |
| 3,526,251 A | 9/1970 | Rosaen .................. 137/625.29 |
| 3,643,692 A | 2/1972 | Traylor .................. 137/625.29 |
| 3,680,596 A | 8/1972 | Pickett .................. 137/625.69 |
| 3,700,007 A | 10/1972 | Sparling et al. |
| 3,874,412 A | 4/1975 | Fleckenstein et al. |
| 4,181,605 A | 1/1980 | Braswell |
| 4,238,325 A | 12/1980 | Heskett |
| 4,239,621 A | 12/1980 | Heskett |
| 4,290,451 A | 9/1981 | Fleckenstein et al. |
| 4,298,025 A | 11/1981 | Prior et al. |
| 4,410,430 A | 10/1983 | Hagler, Jr. |
| 4,426,294 A | 1/1984 | Seal |
| 4,469,602 A | 9/1984 | Seal |
| 4,470,911 A | 9/1984 | Reinke |
| 4,539,106 A | 9/1985 | Schwartz |
| 5,013,461 A | 5/1991 | Drori |
| 5,089,140 A | 2/1992 | Brane et al. |
| 5,300,230 A | 4/1994 | Brane et al. |
| 5,589,058 A | 12/1996 | Bauer |
| 5,639,377 A | 6/1997 | Banham et al. |
| 5,741,005 A | 4/1998 | Vaughan et al. |
| 5,751,598 A | 5/1998 | Zabinski et al. |
| 5,879,559 A | 3/1999 | Schreiner et al. |
| 5,893,976 A | 4/1999 | Bauer |
| 5,910,244 A | 6/1999 | Stamos et al. |

OTHER PUBLICATIONS

SIATA SpA—Societa Italiana Apparecchiature Trattamento Acqua, *Quasar Valve Series Specifications*, Catalog V119, pp. 1–25 (3/01).

"So How Does a Water Softener Work", Avonsoft, http://www.tonyj.demon.co.uk/how.htm, Mar. 10, 2000.

Primary Examiner—Joseph W. Drodge
(74) Attorney, Agent, or Firm—Boyle Fredrickson Newholm Stein & Gratz S.C.

(57) ABSTRACT

A seal stack, configured for supporting, guiding, and sealing a piston of a water softener control valve or the like, can be preassembled prior to its insertion into the associated valve bore and compressed after it is inserted into the bore. This post-assembly seal stack compression assures reliable assembly of the seal stack, facilitates valve assembly and disassembly, and negates the need to hold tight tolerances in bore diameter design and seal diameter design. The seal stack includes a plurality of static seals, a plurality of dynamic seals which are either combined with or separated from the static seals, and a plurality of spacers that support the seals. Each of the static seals is disposed between two adjacent spacers and seals against a peripheral surface of the bore, and each of the dynamic seals is disposed between two adjacent spacers and seals against the piston. Each of the spacers is connected to an adjacent spacer by a lost motion connector that permits limited axial movement therebetween and axial compression of the seal stack when the seal stack is assembled into the bore. Each of the static seals compresses axially and expands radially upon axial compression of the seal stack to enhance the sealing contact between the static seals and the peripheral surface of the bore.

35 Claims, 14 Drawing Sheets

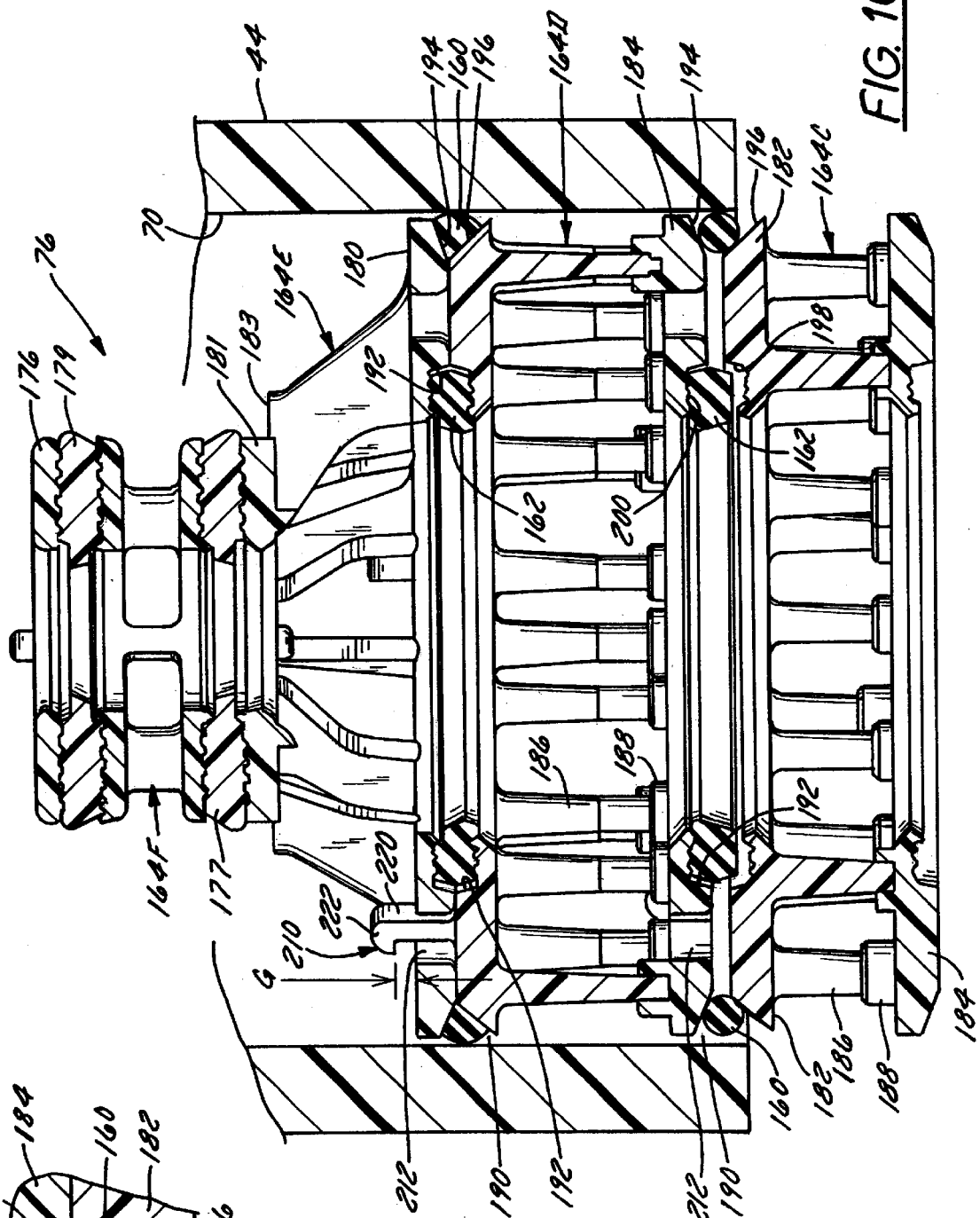
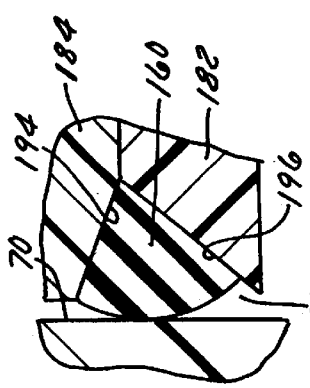
FIG. 10
FIG. 11

WATER SOFTENER CONTROL VALVE WITH REMOVABLE SEAL STACK

BACKGROUND OF THE INVENTION

1. Field of the Invention

The invention relates to water softener control valves and, more particularly, relates to a water softener control valve with a readily removable seal stack and to its methods of assembly and disassembly. The invention additionally relates to a water treatment system employing such a control valve and to methods of installing and removing a seal stack from such a control valve.

2. Discussion of the Related Art

Water softeners are widely used for removing calcium and other deposit causing materials from so-called "hard water." The typical water softener relies on an ion exchange process taking place in an ion-exchange resin bed stored in a resin tank of the water softener. As the water to be processed passes through the resin-filled tank, ions of calcium and other minerals in the water are exchanged with ions found in the resin, e.g., sodium, thereby removing objectionable ions from the water and exchanging them for less objectionable ions from the resin.

The capacity of the resin to exchange ions is finite and is reduced during the ion exchange process. If measures are not taken to regenerate the resin by replacing the undesirable ions with desirable ions, the ion exchange capacity of the resin will become exhausted. Water softeners are typically configured to periodically regenerate the ion exchange resin stored in the resin tank. Regeneration typically involves chemically replacing the objectionable ions such as calcium ions from the resin with less objectionable ions such as sodium ions. This replacement is typically performed by introducing a regenerant solution of sodium chloride or potassium chloride into the resin bed from a brine tank and thereafter flushing the regenerant solution from the bed. Regeneration of a water softener resin bed is sometimes accomplished in a direction that is co-current with the flow of water to be treated (often referred to as "downflow regeneration") and is sometimes accomplished in a direction that is countercurrent to the flow of water being treated (often referred to as "upflow regeneration"). The resin bed is typically backwashed in order to remove trapped particulate matter, and the resin tank can be rinsed to remove objectionable soluble materials. In order to prevent interruption of service, most water softeners are configured to allow bypass flow of untreated water directly to the service lines during backwash, rinse, and regeneration. All of these operations are known in the art.

The regeneration cycle is typically controlled by a control valve mounted on top of the resin tank. The control valve is coupled to a source of untreated water, a treated water or service outlet line, the brine tank, a drain connection, and the resin tank. The typical control valve is controlled by an electric motor under the control of a timer and/or a usage indicator to cycle the water softener from service, brine introduction, backwash, fast rinse, and back to service.

Several different types of control valves have been used in water softeners. Some are of the rotary disc type, in which the motor rotates a three-dimensional valve member to selectively connect and cover various inlet and outlet ports in the valve body bore in which the disc is mounted. A control valve of this type is manufactured by Eco Water of Woodbury, Minn. Another control valve type, manufactured by Osmonics, comprises modified poppet valves. These multiple valve elements are independently actuated by cams. Still others are of the so-called reciprocating piston type, in which the motor drives a piston to reciprocate axially in a bore to selectively connect and cover various inlet and outlet ports in the bore. See, for example, U.S. Pat. No. 3,700,007 to Sparling and U.S. Pat. No. 4,290,451 to Fleckenstein et al. The invention relates to water softeners employing reciprocating piston-type water softener control valves.

The typical reciprocating piston-type water softener control valve includes a seal arrangement that is positioned in a cylindrical bore and that surrounds the reciprocating piston. Some seal stack arrangements are formed from several spacers, static seals, and dynamic seals which are stacked in the cylindrical bore. The static and dynamic seals can be separate members or combined to form a single unitary member. Assembly and disassembly of these seal stacks can be difficult tasks requiring considerable skilled labor. For instance, in one such arrangement, manufactured by Fleck Controls and described to an extent in the Fleckenstein et al. patent, all components of the seal stack are loose and independent of one another. This seal stack must be assembled in the bore by first inserting a spacer into the bore, then inserting a seal, then inserting another spacer, etc. This assembly process is tedious. It can often be difficult to implement because the seals tend to get trapped between the edges of spacers and the bore and then get pinched or cut as the seal stack assembly is tightened down. The resultant damage to the valve could degrade or ruin its operation, but might not be visually apparent. As such, any damage to the valve might not be evident until it fails in the field.

In another type of arrangement known to the inventors, Culligan and Fleck both designed a preassembled seal stack in which the spacers and seals of the stack are screwed together rigidly as a unit before the stack is inserted into the bore. In this type of arrangement, the inner and outer seals of the stack are completely compressed axially prior to insertion of the seal stack into the bore. This axial precompression results in commensurate outward radial expansion of the seals to their final diameter. The precompressed seals must be squeezed past the ports in the bore during valve assembly. This arrangement forces the designer to walk a fine line. If the seals are precompressed too much during seal stack assembly, the stack cannot be inserted into the bore without damaging the seals. If the seals are not precompressed enough during seal stack assembly, they may not provide an adequate seal against the peripheral surface of the cylindrical bore. This design therefore requires the maintenance of tight tolerances on the diameter of the bore and on the diameter of the precompressed static seals. This tolerance requirement produces substantial reliability problems.

The need therefore has arisen to provide a seal stack for a linearly reciprocating piston-type water softener flow control valve or other valve in which the seal stack can be preassembled prior to insertion into the associated bore but in which the seals of the stack need not be precompressed prior to insertion of the seal stack into the bore.

SUMMARY OF THE INVENTION

In accordance with a first aspect of the invention, the above-identified need is satisfied by providing a water softener control valve comprising a valve body which houses a valve element in the internal bore thereof. The valve element includes a piston located in the bore and a seal stack that surrounds the piston. The piston is axially slidable in the bore under the action of a controller to connect various ones of the internal ports to one another in combinations that vary depending upon the position of the piston in the bore.

The seal stack includes a plurality of elastomeric static seals which seal against a peripheral surface of the bore and a plurality of dynamic seals which are disposed radially inwardly of the static seals and which seal against the piston. The seal stack is dimensioned and configured such that (1) the seal stack is compressible axially upon valve assembly to expand the static seals radially to enhance sealing contact between the static seals and the peripheral surface of the bore, and (2) upon initial removal of the seal stack axially from the bore, the seal stack expands axially to permit the static seals to constrict radially. The radial constriction diminishes sealing contact between the static seals and the peripheral surface of the bore and releases the static seals from the peripheral surface of the bore and facilitating further removal of the seal stack from the bore.

Axial compressibility of the seal stack is obtained by connecting at least some of the spacers of the seal stack to one another by lost motion connectors that permit limited axial movement therebetween. Each of the lost motion connectors preferably comprises a hook extending axially from one of the spacers and a receptacle on the adjacent spacer. The lost motion is obtained by dimensioning each of the hooks to have a leg that is substantially longer than a depth of the receptacle.

A seal stack of this or similar construction can be removed from the valve body with relatively little resistance from the static seals. The removal process begins with moving an outermost spacer of the seal stack axially outwardly relative to a first intermediate spacer, thereby permitting a first elastomeric static seal between the outermost and first intermediate spacers to constrict radially to diminish sealing contact between the static seal and the peripheral surface of the bore and to release the first static seal from the peripheral surface of the bore to facilitate further removal of the seal stack from the bore. The outermost spacer and the first intermediate spacer are then moved axially outwardly as a unit relative to a second intermediate spacer, thereby permitting a second elastomeric static seal between the first and second intermediate spacers to constrict radially to diminish sealing contact between the second static seal and the peripheral surface of the bore and to release the second static seal from the peripheral surface of the bore to facilitate further removal of the seal stack from the bore. This process is repeated until all spacers have released from the bore. The seal stack is much easier to remove from the bore than it otherwise would be, because the spacers are broken loose from the bore sequentially rather than all at once.

The sequential release of the spacers from the bore may be enabled by the use of lost motion connectors in the seal stack, in which case each of the moving steps include taking up the lost motion afforded by the associated lost motion connector.

A seal stack constructed in accordance with the invention can also be assembled and inserted into the bore of the valve body with relatively little resistance from the static seals and with little or no risk of damaging the static seals. The process begins with assembling the seal stack outside of the valve body by attaching a plurality of axially-aligned spacers to one another with static seals clamped therebetween so that an outer diameter of at least some of the static seals is less than a diameter of the bore. The preassembled seal stack is then inserted into the bore, and the seal stack is axially compressed to expand radially to enhance sealing contact between the static seals and a peripheral surface of the bore. The compressing step preferably comprises taking up the lost motion afforded by lost motion connectors connecting spacers of the seal stack.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation.

BRIEF DESCRIPTION OF THE DRAWINGS

A preferred exemplary embodiment of the invention is illustrated in the accompanying drawings in which like reference numerals represent like parts throughout, and in which:

FIG. 10 is a fragmentary sectional elevation view showing removal of the seal stack from the associated bore of the control valve;

FIG. 11 is a detail view of a portion of the subassembly of FIG. 10;

DETAILED DESCRIPTION OF THE PREFERRED EMBODIMENT

1. Resume

Pursuant to the invention, a seal stack is provided that is configured for supporting, guiding, and sealing a piston of a water softener control valve or the like and that can be preassembled prior to its insertion into the associated valve bore but that is not compressed until after it is inserted into the bore. This post-assembly seal stack compression assures reliable assembly of the seal stack, facilitates valve assembly and disassembly, and negates the need to hold tight tolerances in bore diameter design and seal diameter design. The seal stack includes a plurality of dynamic seals, a plurality of static seals, and a plurality of spacers that support the seals. Each of the static seals is disposed between two adjacent spacers and seals against a peripheral surface of the bore, and each of the dynamic seals is disposed between two adjacent spacers and seals against the piston. Each of the spacers is connected to an adjacent spacer by a lost motion connector that permits limited axial movement therebetween and axial compression of the seal stack when the seal stack is assembled into the bore. Each of the static seals compresses axially and expands radially upon axial compression of the seal stack to enhance the sealing contact between the static seals and the peripheral surface of the bore.

2. System Overview

Figure 1:
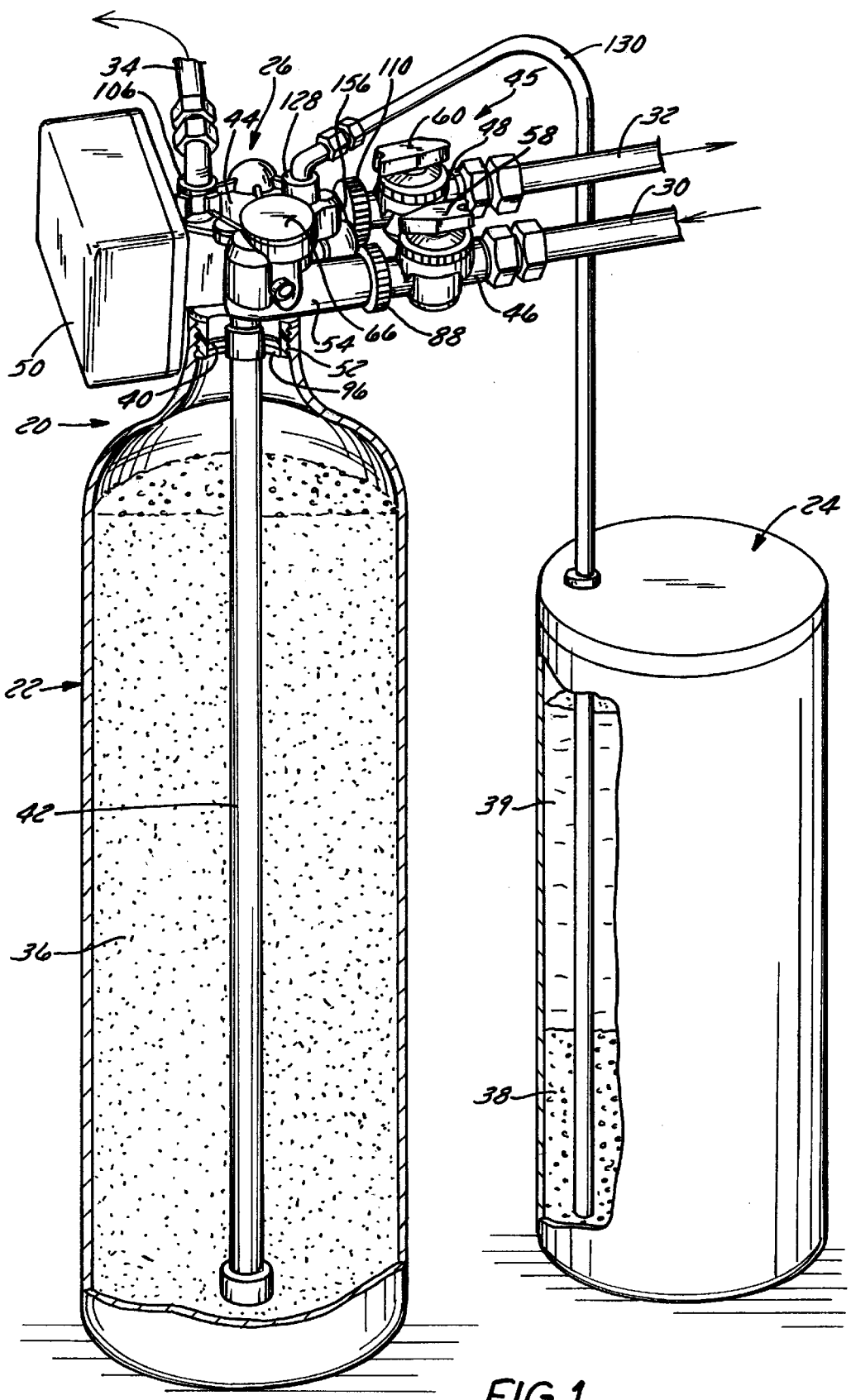
FIG. 1 is a partially-cut away perspective view of a water softener employing a water softener control valve constructed in accordance with a preferred embodiment of the present invention.

Referring to the drawings and initially to FIG. 1, a water softener 20 is illustrated that employs a control valve and seal stack constructed in accordance with a preferred embodiment of the invention. The water softener 20 includes a resin tank 22, a brine tank 24, and a control valve 26 threaded onto the top of the resin tank 22. The control valve 26 is fluidically coupled to the resin tank 22, the brine tank 24, a line 30 leading to a source of untreated water, a treated water line 32, and a drain line 34. The resin tank 22 is filled with a treatment medium such as an ion exchange resin bed 36, and the brine tank 24 contains particles 38 of sodium chloride, potassium permanganate, or another suitable regeneration medium which can be dissolved by water to form a brine or regenerant solution 39. In operation, as incoming hard water enters the resin tank 22 through an opening 40 in the top of the resin tank 22, the water in the resin tank is forced through the resin bed 36 and out a distribution tube 42 extending through the center of the resin bed 36. The capacity of the resin bed 36 to exchange ions with the minerals and impurities in the incoming hard water is finite, and depends on (1) the treatment capacity of the resin bed 36 as measured in kilograms of hardness or grams of $CaCO_3$ and (2) the hardness of the incoming water as typically measured in grains per gallon. To regenerate the resin bed 36 once its treating capacity has been depleted, the resin bed 36 is flushed with the regenerant solution 39 from the brine tank 24 so that the minerals and other impurities can be released from the resin bed 36 and carried out of the resin tank 22. All of these operations, as well as optional attendant backwash and rinse operations, are controlled by the water softener control valve 26.

Figure 2:
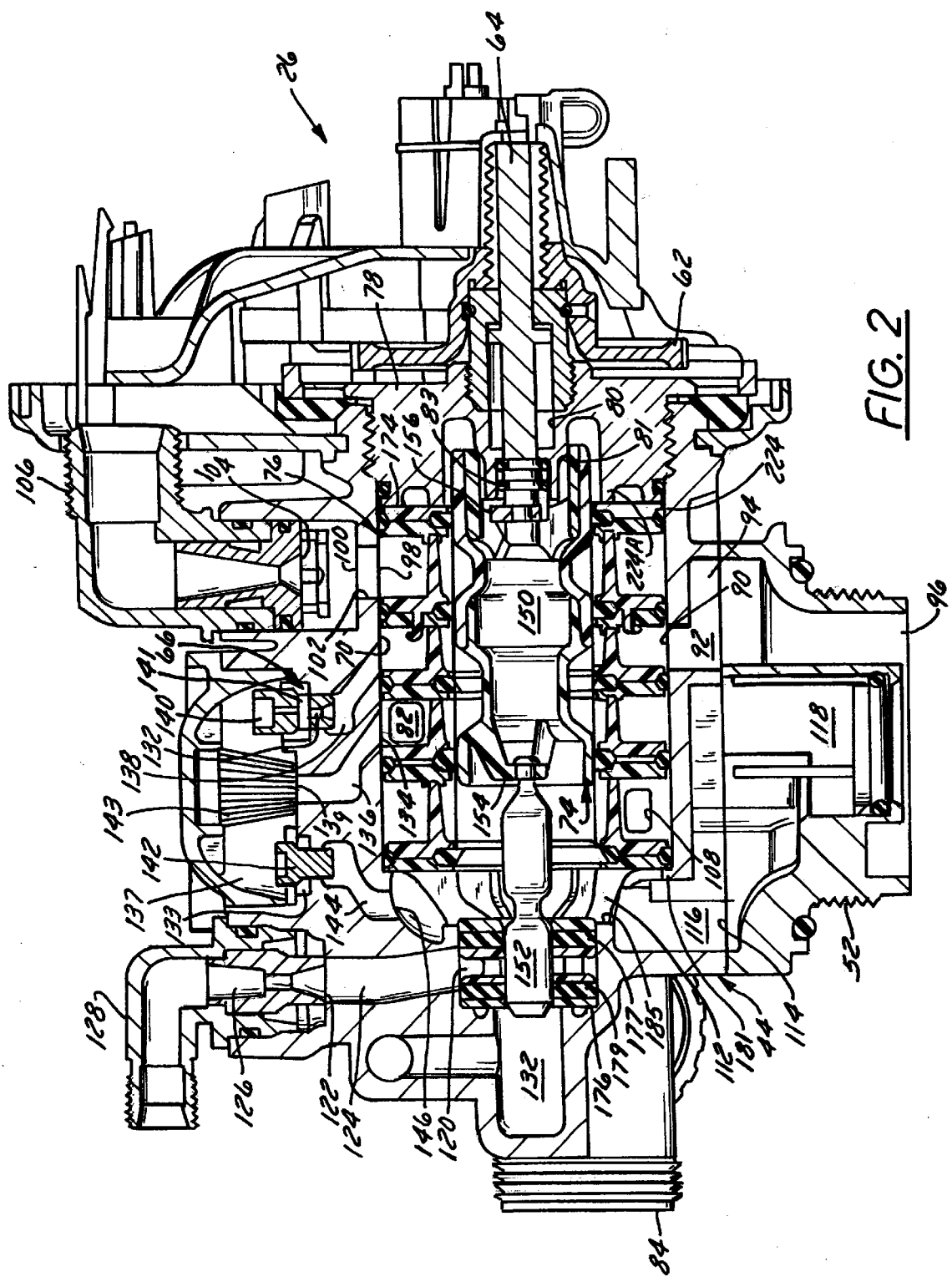
FIG. 2 is a sectional side elevation view of the control valve of the water softener of FIG. 1.
Figure 3:
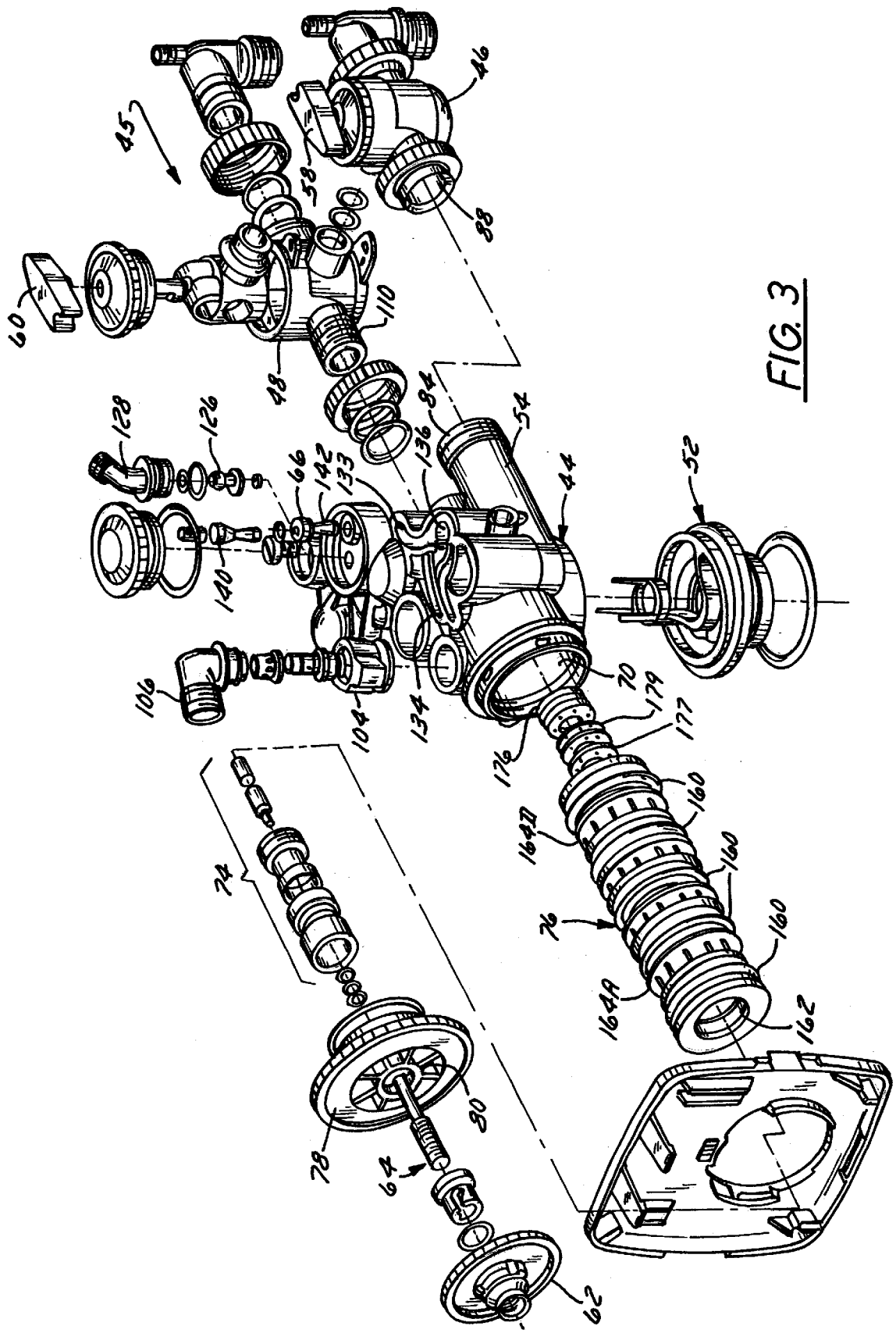
FIG. 3 is an exploded perspective view of the control valve.
Figure 4:
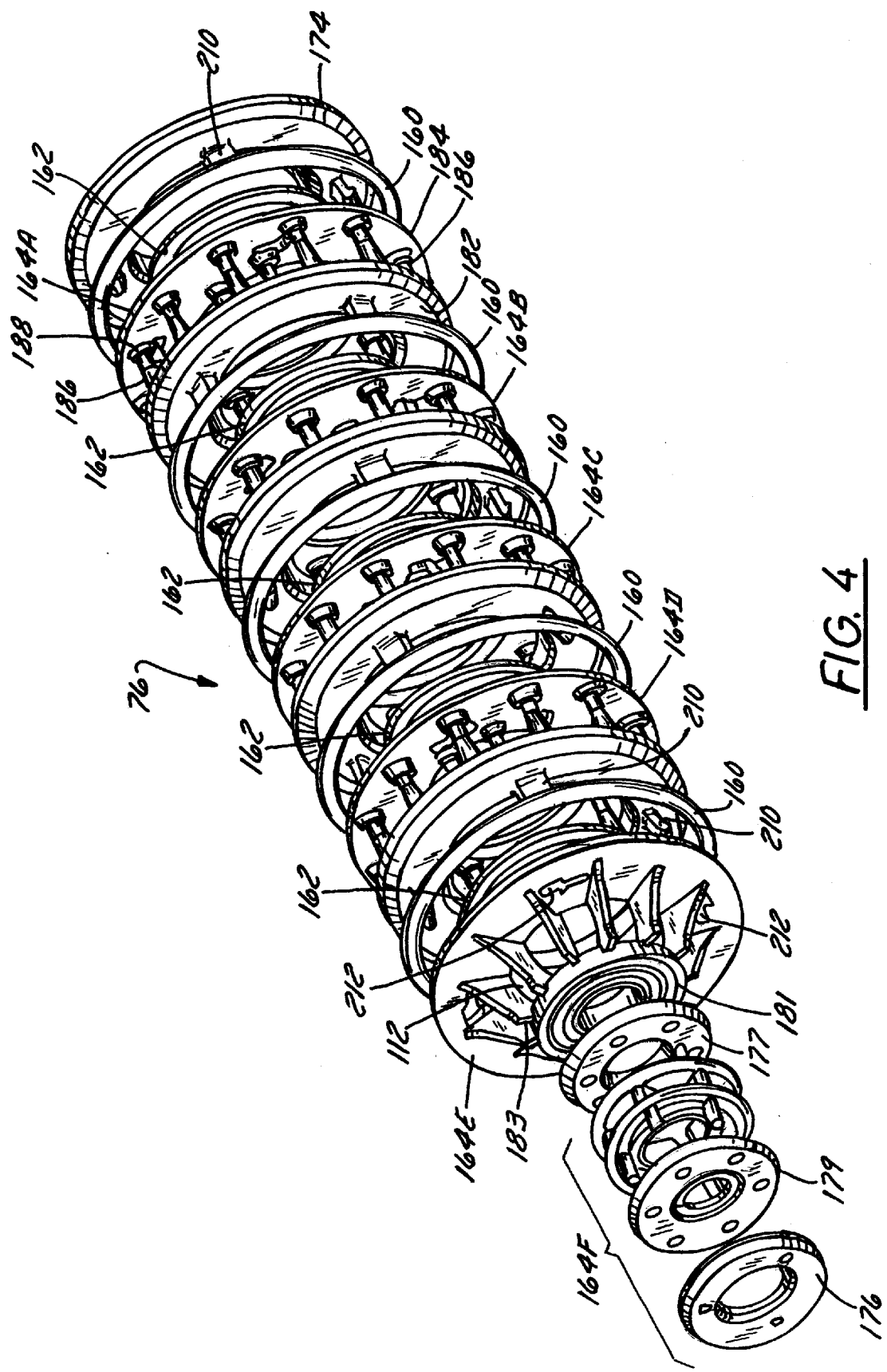
FIG. 4 is an exploded perspective view of a seal stack of the control valve.
Figure 6:
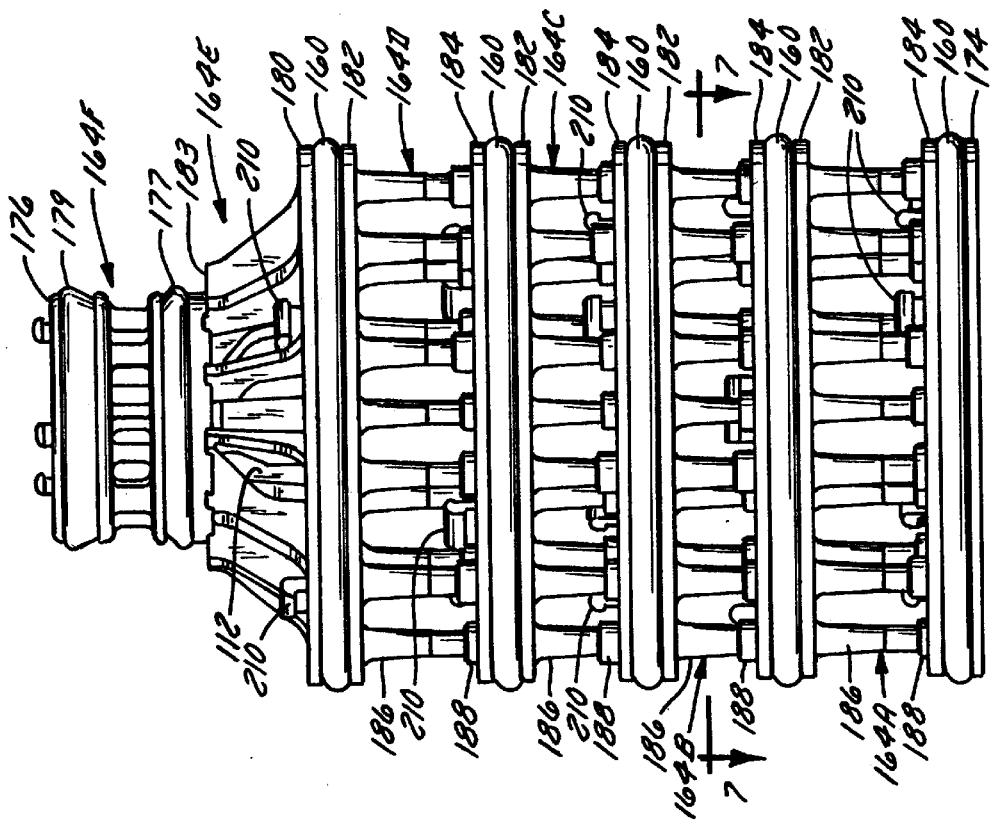
FIG. 6 is an elevation view of the seal stack.
Figure 5:
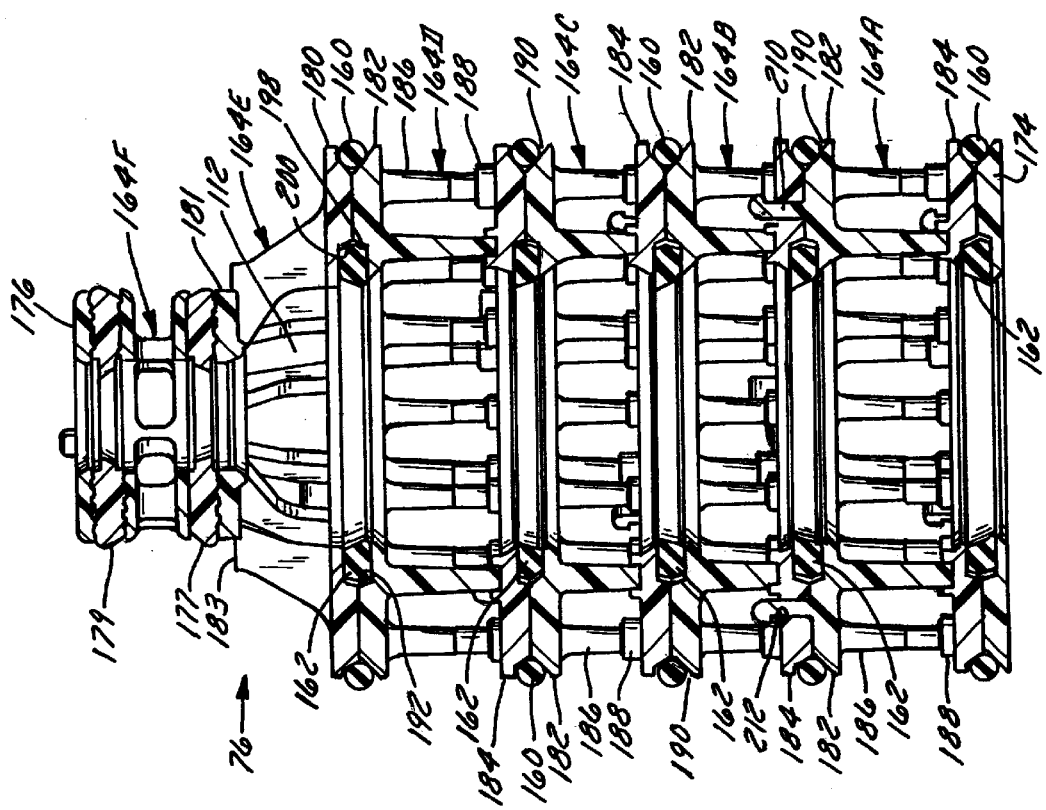
FIG. 5 is a sectional elevation view of the seal stack of FIG. 4.
Figure 7:
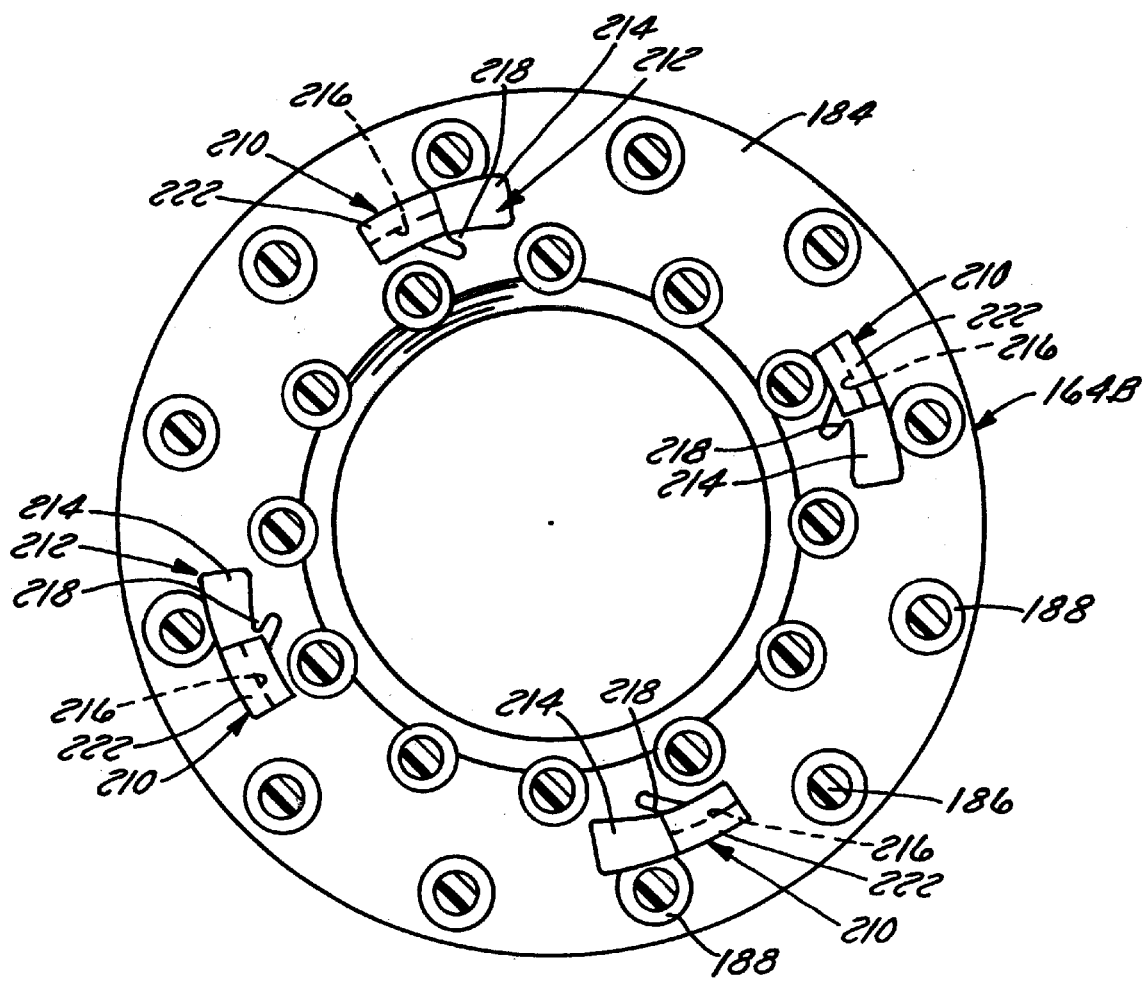
FIG. 7 is a sectional plan view taken generally along the lines 7—7 in FIG. 6.

Referring to FIGS. 1–3 the valve 26 includes a valve body 44, a bypass valve 45 (formed from an untreated water inlet module 46 and a treated water or service outlet module 48), and a timer/controller module 50. The valve 26 is mounted on the resin tank 22 via a valve body mount 52 threaded into the top of the resin tank at its lower end and connected to the bottom of the valve body 44 at its upper end. The bypass valve 45 is mounted on rearwardly extending couplers 54 and 56 of the valve body 44. Knobs 58 and 60 of the valve 45 can be turned to permit the water softener 20 to be bypassed altogether for service or repair. The timer/control module 50 is mounted on a front of the valve body 44 and includes a timer and/or an electronic controller for energizing an electrically operated valve driver such as a reversible dc electric motor (not shown). The valve driver drives a gear 62 to linearly translate a threaded drive rod 64 that extends into the valve body 44 to operate the valve 26. An injector 66 is mounted on top of the valve body 44 for drawing the regenerant solution 39 through the resin tank 22 during a regeneration cycle. Still referring to FIGS. 2 and 14–18 the valve body 44 comprises an injection molded plastic element having several fittings and other components mounted thereon. A central bore 70 is formed in the valve body 44 and is configured to receive a valve element 72 formed from a linearly movable piston 74 and a seal stack 76, both detailed below. The bore 70 is capped at its outer end by a cap 78 that is threaded into the outer end of the bore 70 and that has an internal opening 80 for the passage of the drive rod 64.

Also molded within the valve body 44 are several external ports opening into the exterior of the valve body 44, several interior ports opening into the bore 70, and several passages connecting the internal ports to the external ports. Specifically, referring to FIGS. 2 and 14–18, an internal untreated water inlet port 82 opens radially into a central portion of the bore 70 and is connected to an external untreated water inlet port 84 via an untreated water flow passage (not shown). The external untreated water inlet port 84 is connected to a fitting 88 (FIG. 1) opening into the untreated water inlet valve module 46. An internal top-of-tank port 90 opens radially into the bore 70 at a location just outwardly of the untreated water inlet port 82 and communicates with an external top of tank port 92 via a flow passage 94. The external top of tank port 92 opens into a first flow passage 96 in the resin tank mount 52 that communicates with the opening 40 in the top of the resin tank 22. An internal drain port 98 opens radially into the bore 70 at a location just outwardly of the top of tank port 90 and communicates with an external drain port 100 of the valve body 44 via a flow passage 102 (only a portion of which is shown). The external drain port 100 opens into a drain assembly including a restricting flow control valve 104 and a fitting 106 configured for connection to the drain line 34. An internal treated water outlet port 108 opens radially into the bore 70 at a location just inwardly of the untreated water inlet port 82 and is connected to an external treated water outlet port via a flow passage (neither of which is shown). The external treated water outlet port is connected to a fitting 110 (FIG. 1) opening into the service valve module 48. An internal distribution port 112 opens radially into the bore 70 at a location axially inwardly of the service port 108 and communicates with an external distribution port 114 via a flow passage 116. The external distribution port 114 opens into a second flow passage 118 in the resin tank mount 52 that communicates with an inlet of the distribution tube 42. An internal brine port 120 opens radially into a reduced diameter inner end section of the bore 70 at a location downstream of the distribution port 112 and communicates with an external brine port 122 via a flow passage 124. The external brine port 122 opens into a brine fitting assembly including a restricting flow control valve 126 and a fitting 128 configured for connection to a regenerant solution line 130 that leads to the brine tank 24 as seen in FIG. 1.

Still referring to FIGS. 2 and 14–18, the injector 66 comprises a nozzle 140 and a throat 141. An injector inlet passage 132 is formed by the inner axial endmost section of the bore 70. Passage 132 opens into a chamber 133 communicating with the injector 66 between the nozzle 140 and the throat 141. Another chamber 137, located above the chamber 133, houses an injector screen 143. Water flows into an inlet 139 of the chamber 137 via an inlet passage 136 coupled to the untreated water inlet port 82.

In the illustrated configuration in which the valve 26 is configured for downflow regeneration, the outlet of the injector 66 opens into a passage 138 coupled to the top-of-tank port 90. Another passage 144, coupled to the distribution port 112, is plugged with a plug 142. With this configuration, water from the passage 136 flows into the chamber 137 through the inlet 139, and then flows through the screen 143, through the injector 66, and into the top-of-tank port 90 through the passage 138. The pressure drop created by this flow draws regenerant solution 39 through the throat 141 and into the passage 138 from the inlet passage 132, thus causing regenerant solution to flow into the resin tank 22 from above.

The valve 26 could be configured for upflow regeneration by switching the locations of the injector 66 and the plug 142 in order to permit fluid flow through a passage 144 in fluid communication with the distribution port 112 and in order to prevent fluid flow into the top-of-tank port 90 via the passage 138. With this configuration, water from the passage 136 flows into the chamber 137 through the inlet 139, through the screen 143, through the injector 66, and into the distribution port 112 through the passage 146. The pressure drop created by this flow draws regenerant solution 39 through the throat 141 and into the passage 144 from the inlet passage 132, thus causing regenerant solution 39 to flow into the resin tank 22 from below.

As briefly discussed above, flow between the various ports of the valve body 44 is controlled by the valve element 72 as actuated by the controller and the valve driver. A preferred valve element will now be detailed.

3. Valve Element

The piston 74 and seal stack 76 of the valve element 72 are configured, depending on the location of the piston 74 within the seal stack 76, to connect various ones of the internal ports of the valve body 44 to one another, thereby setting flowpaths through the valve body 44 that differ with piston position. The seal stack 76 also is configured to be easily inserted into and removed from the bore 70 as a unit while still assuring a tight seal against the peripheral surface of the bore 70 when the valve 26 is assembled. The piston 74 and seal stack 76 will now be discussed in turn.

Referring to FIGS. 2, 4, and 14–18, the piston 74 may comprise any structure or combination of structures that is linearly reciprocatable within the seal stack to selectively engage the dynamic seals 162 (detailed below) to place selected ones of the ports 82, 84, 90, etc. into communication with one another. In the illustrated embodiment, the piston 74 comprises a main section 150 and a brine section 152 connected end to end. The main portion 150 is hollow and has clips 154 and 156 in its inner and outer ends for attachment to a tail of the drive rod 64 and a head of the brine portion 152 respectively, thereby assuring that the drive rod 64, the main portion 150, and brine portion 152 all move as a unit upon axial translation of the drive rod 64 relative to the valve body 44. The brine portion 152 is of a considerably smaller diameter than the main portion 150. Both portions are stepped so as to present a plurality of lands separated from one another by circular grooves. The outer peripheries of both portions are formed of a relatively rigid, durable, water impervious substance such as polypropylene or polyphenylene oxide (PPO).

Referring to FIGS. 3–6, the seal stack 76 is formed from a plurality of radially outer, axially spaced static seals 160 that seal against the peripheral surface of the bore 70, a plurality of radially inner, axially spaced dynamic seals 162 that seal against the lands of the piston 74, and a plurality of spacers 164A–164F. The static seals 160 comprise simple O-rings formed of natural rubber, synthetic rubber, or any elastomeric material suitable for use in a static seal. An EPDM rubber or LSR is preferred. The uncompressed diameter of the static seal 160 is preferably less than the diameter of the bore 70. This relationship permits free sliding movement of the static seals 160 past the relatively large, unobstructed ports in the bore 70 during valve assembly and disassembly. Otherwise, the seals 160 could extend into the ports, potentially damaging the seals.

While each set of axially aligned static and dynamic seals 160 and 162 is preferably formed from two distinct members, the seals 160 and 162 of each set could also be combined to form a single annular member whose inner periphery forms the dynamic seal of the set and whose outer periphery forms the static seal of the set. For instance, the seals 160 and 162 could be formed from the same material and connected to one another by a membrane of the same material. They could also be formed from different materials and connected to one another by an annular member formed from the same material as one of the seals or another material entirely.

Figure 12:
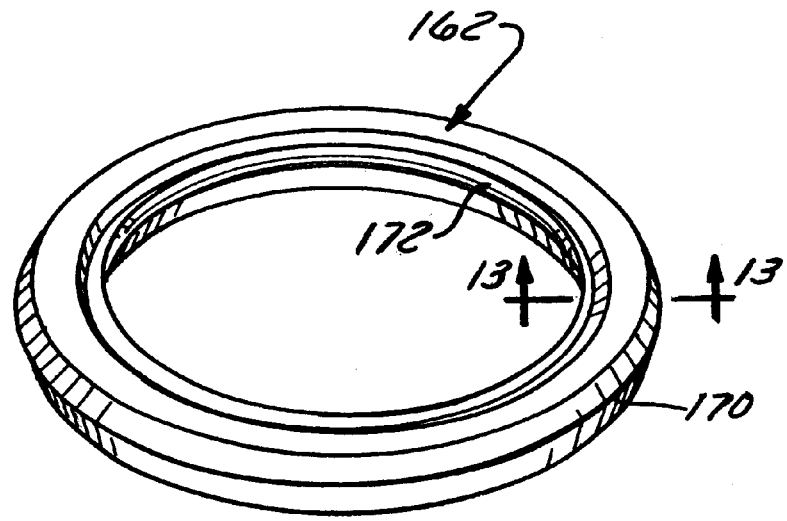
FIG. 12 is a perspective view of one of the dynamic seals of the seal stack.
Figure 13:
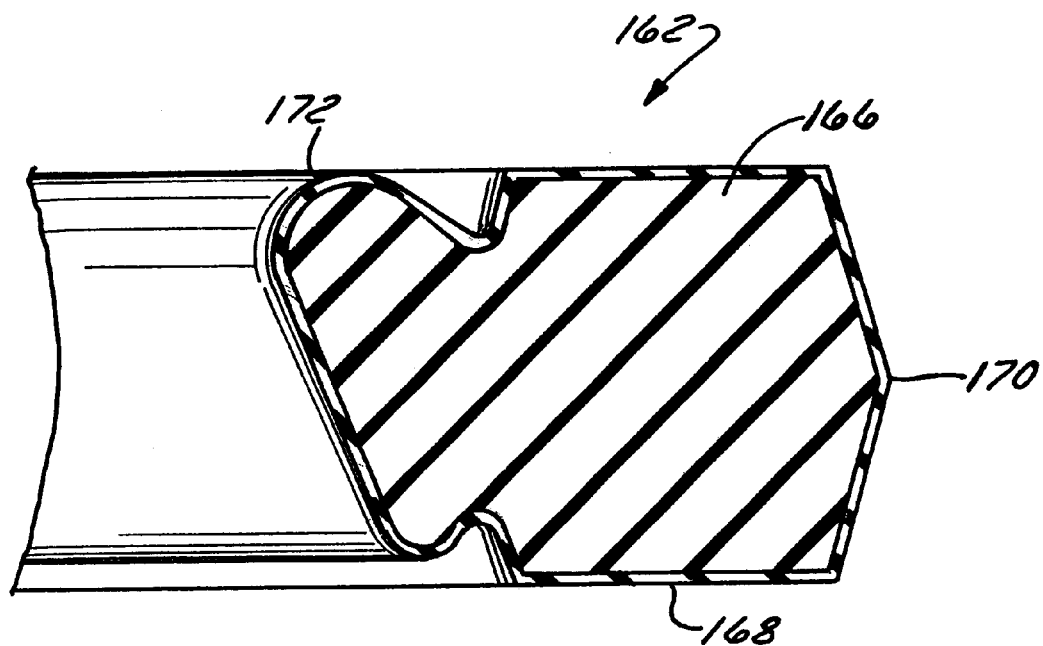
FIG. 13 is a sectional elevation view taken generally along the lines 13—13 in FIG. 12.

The dynamic seals 162 may be formed of natural rubber, synthetic rubber, or any elastomeric material suitable for use in a dynamic seal. As best seen in FIGS. 12 and 13, an especially preferred material is composite material including a core 166 of liquid silicone rubber "LSR" and a thin layer or coating 168 of Paralene C or Paralene N. The seal 162 is not a true ring but instead is generally V-shaped at its outer periphery 170 for seating in the associated seal groove as discussed below. It also has a lip portion 172 at its inner periphery which serves as the actual dynamic sealing surface of the seal 162. The lip portion 172 is asymmetrical about a radial plane bisecting it in order to provide a seal against the piston 74 that is pressure-actuated on the larger lobe of the lip portion 172.

Referring to FIGS. 2 and 4–7, the spacers 164A–164F support the seals 160 and 162 in their spaced-apart relationships. The illustrated embodiment employs four primary spacers 164A–164D that surround the primary piston portion 150, a fifth, stepped spacer 164E that surrounds the outer end of the brine piston portion 152, and a sixth spacer 164F of reduced diameter that surrounds the inner end of the brine piston portion 152. Caps 174 and 176 are clipped onto the ends of the end-most spacers 164A and 164F. A first combined seal 177 is clamped between the fifth and sixth spacers 164E and 164F, and a second combined seal 179 is clamped between the sixth spacer 164F and the cap 176. Both seals 177 and 179 seal against the peripheral surface of the bore 70 at their outer peripheries and against the brine portion 152 of the piston 74 at their inner peripheries. These seals 177 and 179 therefore act as both static seals and dynamic seals.

The fifth spacer 164E tapers from inner to outer axial ends 180 and 181 thereof. An annular shoulder 183, formed near the inner end 181, seats against an axial shoulder 185 of the bore 70 (see FIG. 2) wall to arrest the inner end of the seal stack 76 from additional inward movement when the seal stack 76 is inserted into the bore 70.

The first through fourth spacers 164A–164D are of identical construction except for the fact that the second and third spacers 164B and 164C are of a reduced axial length relative to the first and fourth spacers 164A and 164D to accommodate the associated ports and lands on the bore 70 and the piston 74. The second spacer 164B therefore will be described, it being understood that the same description applies equally to the remaining spacers. Referring to FIGS. 5–11, spacer 164B comprises an injection molded plastic element including inner and outer annular rings 182 and 184 connected to one another by axially-extending posts 186. The posts 186 are injected onto an outer axial surface of the inner annular ring 182 and are affixed to tubular receptacles 188 injected onto the facing inner axial surface of the outer annular ring 184. The inner and outer peripheries of the facing surfaces of the annular rings 182 and 184 of each adjacent pair of annular rings are tapered relative to one another to form seal grooves 190 and 192 for receiving the associated static and dynamic seals 160 and 162. Referring particularly to FIGS. 10 and 11, the walls 194 and 196 of each of the outer seal grooves 190 are tapered relative to a radial plane. As best seen in FIG. 11, the inner wall 194 of each seal groove 190 is inclined less severely relative to the radial plane than the outer wall 196 in order to facilitate release of the associated static seal 160 from the peripheral surface of the bore 70 upon seal stack removal. Preferably, the outer wall 196 is inclined at an angle of more than 45° from the radial plane, and the inner wall 194 is inclined at an angle of less than 45° from the radial plane and preferably less than 30°. An especially preferred relationship is a 45° taper on the outer wall 196 and a 280 taper on the inner wall 194.

Figure 8:
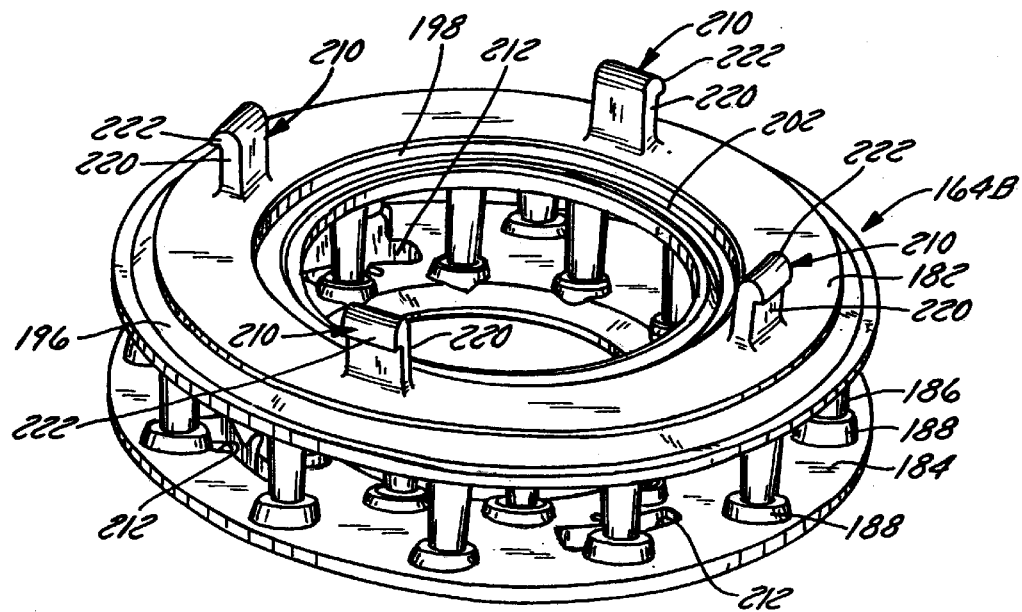
FIGS. 8 and 9 are perspective views of a spacer of the seal stack, viewed from opposite sides of the spacer.
Figure 9:
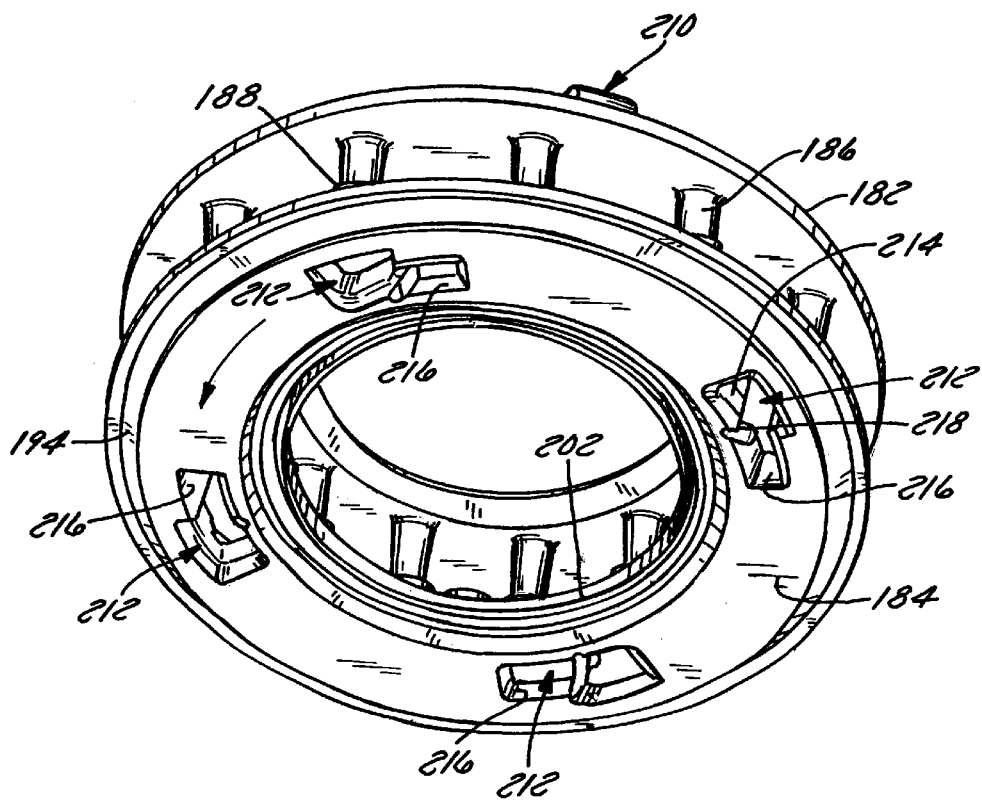

Referring to FIGS. 8–10, the seal groove 192 for each of the dynamic seals 162 is formed from generally C-shaped notches 198 and 200 in the facing inner peripheries of the adjacent spacers 182 and 184. The axial surface of each of the notches 198 and 200 has one or more annular ribs 202 that engage the associated dynamic seal 162 to help hold the associated dynamic seal in place during sliding motion of the piston 74 against the seal 162 and to help the seal 162 seal against the notches 198 and 200. This action is necessary to keep the dynamic seal 162 in place as the piston moves back and forth against it. This can be a difficult task given that the seal 162 may experience up to a 125 psi pressure differential thereacross during normal operation in addition to dynamic forces imposed by water flowing past it at rates up to 30 gallons per minute. However, the retention forces should not be so strong that the seals 162 are unnecessarily deformed. It has been found that adequate retention forces are obtained by providing the ribs 202 on the notches 198 and 200 in combination with the mating relationship between the generally V-shaped outer peripheral surface 170 of the seals 162 and a mating surface formed by the outer periphery of the seal groove 192.

The first through fifth spacers 164A–164E and the associated seals 160 and 162 are arranged relative to one another to facilitate insertion and removal of the seal stack 76 into and from the bore 70 while assuring tight static and dynamic seals when the valve 26 is assembled. This goal is achieved by configuring the seal stack 76 to be compressible axially upon valve assembly. Axial compression of the seal stack 76 causes the static seals 160 to expand radially to first initiate and then enhance sealing contact between the static seals 160 and the peripheral surface of the bore 70 and the outer seal grooves 190. The seal stack 76 also is configured to expand axially upon initial removal of the seal stack 76 from the bore 70 to permit the static seals 160 to constrict radially to diminish sealing contact between the static seals 160 and the peripheral surface of the bore 70, thereby releasing the static seals 160 from the peripheral surface of the bore 70 and facilitating further removal of the seal stack 76 from the bore 70.

Towards these ends, at least some of the spacers 164A–164E are connected to one another via a lost motion connector that permits the spacing between adjacent spacers to vary, hence selectively compressing and releasing the seals 160 clamped between each adjacent pair of spacers. Lost motion may, for example, be accommodated by a deflectable snap mechanism. In the illustrated embodiment, each lost motion connector comprises a plurality of hooks 210 extending axially inwardly from the inner ring 182 of one of the spacers and a corresponding plurality of receptacles 212 located in the outer ring 184 of the adjacent spacer. Four equally-spaced hooks 210 and corresponding receptacles 212 are provided on each set of mating spacers in the illustrated embodiment. Each of the receptacles 212 comprises an arcuate slot formed in the ring 184 and having a receptacle portion 214 and a latching portion 216 that is of a reduced radial width when compared to that of the receptacle portion 214. Each of the receptacles 212 also has a detent 218 at an inner radial periphery thereof that hinders unintended disassembly of the seal stack 76. The hooks and receptacles could be replaced by other mating latch structures such as headed posts and stepped-diameter slots.

As best seen in FIG. 10, each hook 210 is generally J-shaped, having an axial leg portion 220 and a radial latch portion 222 located on the distal end of the of the leg portion 220 and configured to engage the axial outer surface of the inner ring 184 of the adjacent spacer. Each leg portion 220 is substantially longer than the thickness of the associated inner ring 184, thereby leaving a potential gap G between the latch portion 222 and the inner ring 184 when the adjacent rings 184 and 182 are pressed flat against one another as seen in FIG. 10. The accumulated thickness of the gaps of all of the lost motion connectors defines the maximum possible compression of an assembled seal stack 76. In the illustrated embodiment in which each gap G is approximately 0.05" wide, the maximum compression of the seal stack 76 is about 0.25". The relative diameters of the seal grooves 190 and the static seals 160 are set such that, upon this maximum seal stack compression, each static seal 160 expands about 0.03" radially. This substantial expansion permits the diameter of the bore 70 to be substantially greater than the unexpanded diameter of the static seals 160, permitting the seal stack 76 to be easily inserted into and removed from the bore 70 in its uncompressed state without having to carefully dimension the diameter of the bore 70 relative to the diameter of the seals 160.

The seal stack 76 is assembled and inserted into the bore 70 in the following process. First, for each successive pair of spacers (e.g., 164A and 164B or 164B and 164C), the dynamic seal 162 associated with that pair are placed on one of the walls of the associated seal groove 192, and the static seal 160 is slipped over the spacer next to the associated seal groove 190. (The static seal cannot be easily prepositioned in the seal groove 190 because it is undersized relative to the diameter of the seal groove 190 in order to facilitate seal stack expansion and contraction). The hooks 210 on the outer spacer are then inserted into the receptacle portions 214 of the receptacles 212 of the inner spacer of the pair. The spacers are then rotated relative to one another as represented by the arrow in FIG. 9 to position the hooks 210 in the latching portions 216 of the receptacles 212, thereby latching the spacers together. This process is repeated for each spacer. The static seals 160 are then turned or slipped into the associated seal grooves 190 between the adjacent spacers, thereby completing the preassembly process. This preassembly operation negates the need to attempt to properly position the seals 160, 162, 177, and 179 directly in the bore 70, preventing the seals from being twisted, mislocated, or cut during the remainder of the assembly process.

The preassembled seal stack 76 is then inserted into the bore 70 so that the annular shoulder 183 on the fifth spacer 164E rests on the axial shoulder 185 on the bore periphery as seen in FIG. 2. The spacer ring 164E also engages a flange 181 on the valve housing at this time. The ample radial clearance between the static seals 160 and the peripheral surface of the bore 70 permits this insertion to be performed with little effort. The preferred method of assembly is to reach through the center of the dynamic seals 162 and push on the closed surface of a leading spacer 164E rather than pushing on the spacer ring. This motion forces the stack 76 to remain axially expanded during the insertion process and facilitates insertion. Then, the cap/piston assembly 74, 78 is inserted into the open end of the bore 70 so that the piston 74 slides through the seal stack 76 and the external threads on the cap 78 mate with corresponding internal threads in the valve body 44. The cap 78 is then screwed into the valve body 44 so that inner boss 224 and 224A of the cap 78 engage the outer end 174 of the seal stack 76 and axially compresses the seal stack 76 against the shoulder 185 of the bore 70. The static seals 160 are compressed axially and, accordingly, expand radially during this compression to first initiate and then improve sealing contact between the static seals 160 and the peripheral surface of the bore 70 and to seal against at least one seal groove of the associated spacers. The relative positions of the spacers is defined by the physical relationships of the spacers themselves, not the seals between them. Differential pressures across the spacers could cause additional relative movement of the spacers within the bore, displacing the seals and abrading them. This seal abrasion is avoided by the illustrated spacer design. This relationship also prevents movement of the sealing point for the piston.

Seal stack removal takes place in essentially the reverse operation. The cap/piston assembly 74, 78 is simply unscrewed from the bore 70 and removed, thereby removing the compressive retention forces from the seal stack 76. The seal stack 76 is then simply gripped and removed from the bore 70 from the outer end. This removal is facilitated by the sequential movement of the lost motion connectors. That is, the combined gripping forces imposed on the peripheral surface of the bore 70 by all of the static seals 160 are substantial and can be very difficult to overcome. However, the lost motion connectors permit the much smaller gripping forces of the individual static seals 160 to be overcome sequentially. For instance, the second spacer 164B remains in place upon initial outward movement of the first or outermost spacer 164A of the seal stack 76 relative to the second spacer 164B. The static seal 160 between the spacers 164A and 164B constricts radially upon this relative movement to diminish sealing contact between the static seal 160 and the peripheral surface of the bore 70 to facilitate further removal of the seal stack 76 from the bore 70. Seal release is also facilitated by the asymmetric taper of the walls 194 and 196 of the seal groove 190, which prevents the seal 160 from wedging against the peripheral surface of the bore 70 when the second spacer 164B begins to move. Then, after the first seal has released and the lost motion afforded by the lost motion connection between the first and second spacers 164A and 164B is taken up, the first spacers 164A, 164B and the associated seal move outwardly without any resistance from the seal. Even if the seal 160 between the first and second spacers 164A and 164B remains in gripping contact with the bore 70 after the first spacer 164A begins to move, the relatively high retention forces of only that seal must be overcome during the next phase of seal stack removal. The next seal does not impose any resistance to motion because the lost motion between the second and third spacers 164B and 164C is merely being taken up at this time. This effect is illustrated in FIG. 10, which shows the seal 160 between the fourth and fifth spacers 164D and 164E in its compressed state and the remaining seals 160 in their released state. Even after the lost motion connection between the second and third spacers 164B and 164C is taken up and the associated seal begins to resist additional motion of the seal stack 76, much lower resistance is provided to seal stack motion by the already-moving seals than would be imposed if all seals had to be broken loose from the bore 70 simultaneously. Hence, although the overall resistance to seal stack removal may increase throughout the removal process, the much greater removal forces required to break the stationary seals loose from the bore 70 are overcome sequentially rather than all at once. The aggregate resistance to seal stack removal therefore is rather small when compared to a comparable seal stack lacking lost motion connectors between adjacent sections of the stack.

4. Operation of the Water Softener

The water softener control valve 26 operates in a sequence that includes at least a fill phase and a regeneration phase. It may also include a backwash phase. The preferred sequence will now be discussed.

Figure 14:
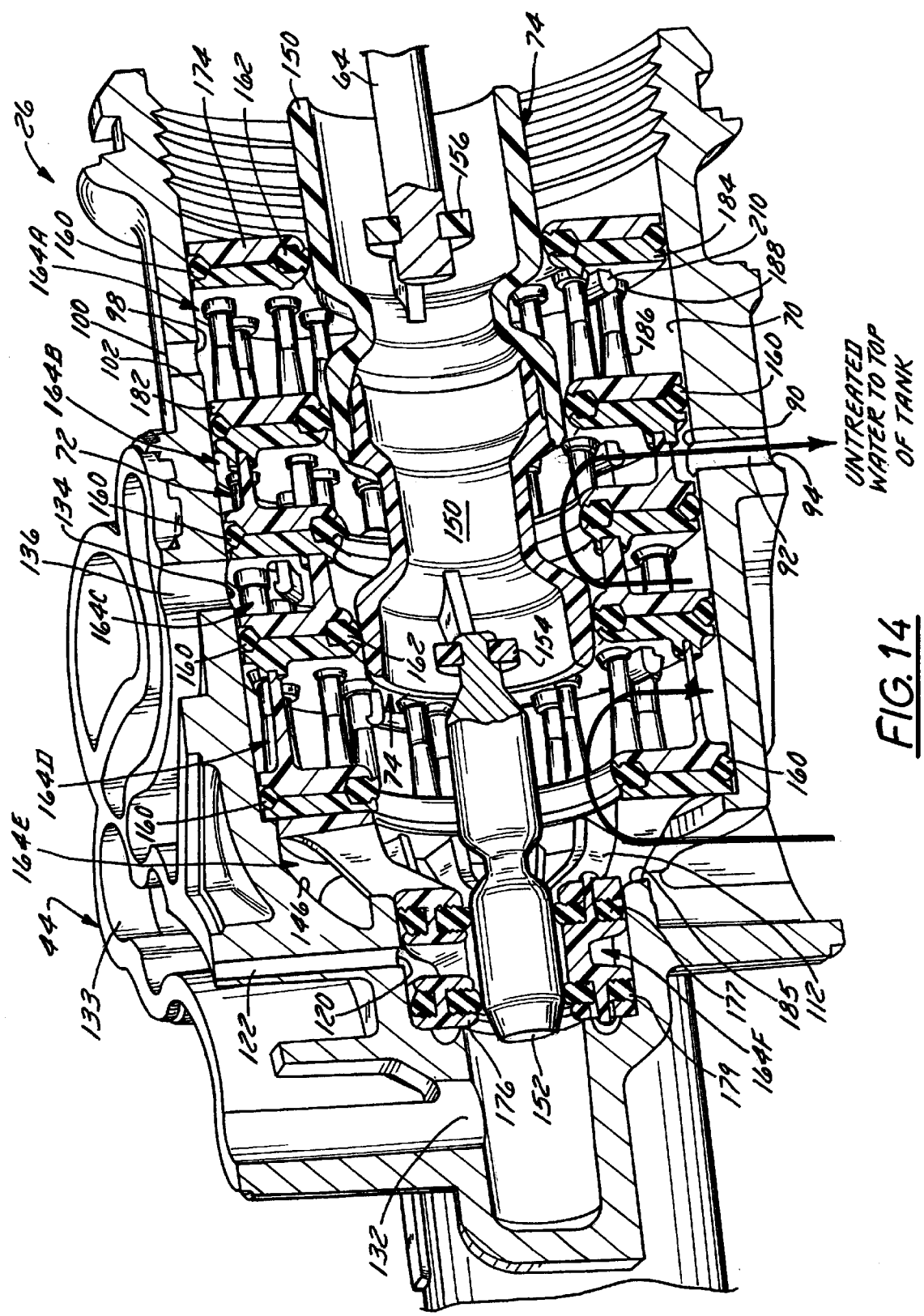
FIGS. 14–18 are a series of sectional partially schematic elevation views showing an operational sequence of the control valve.
Figure 15:
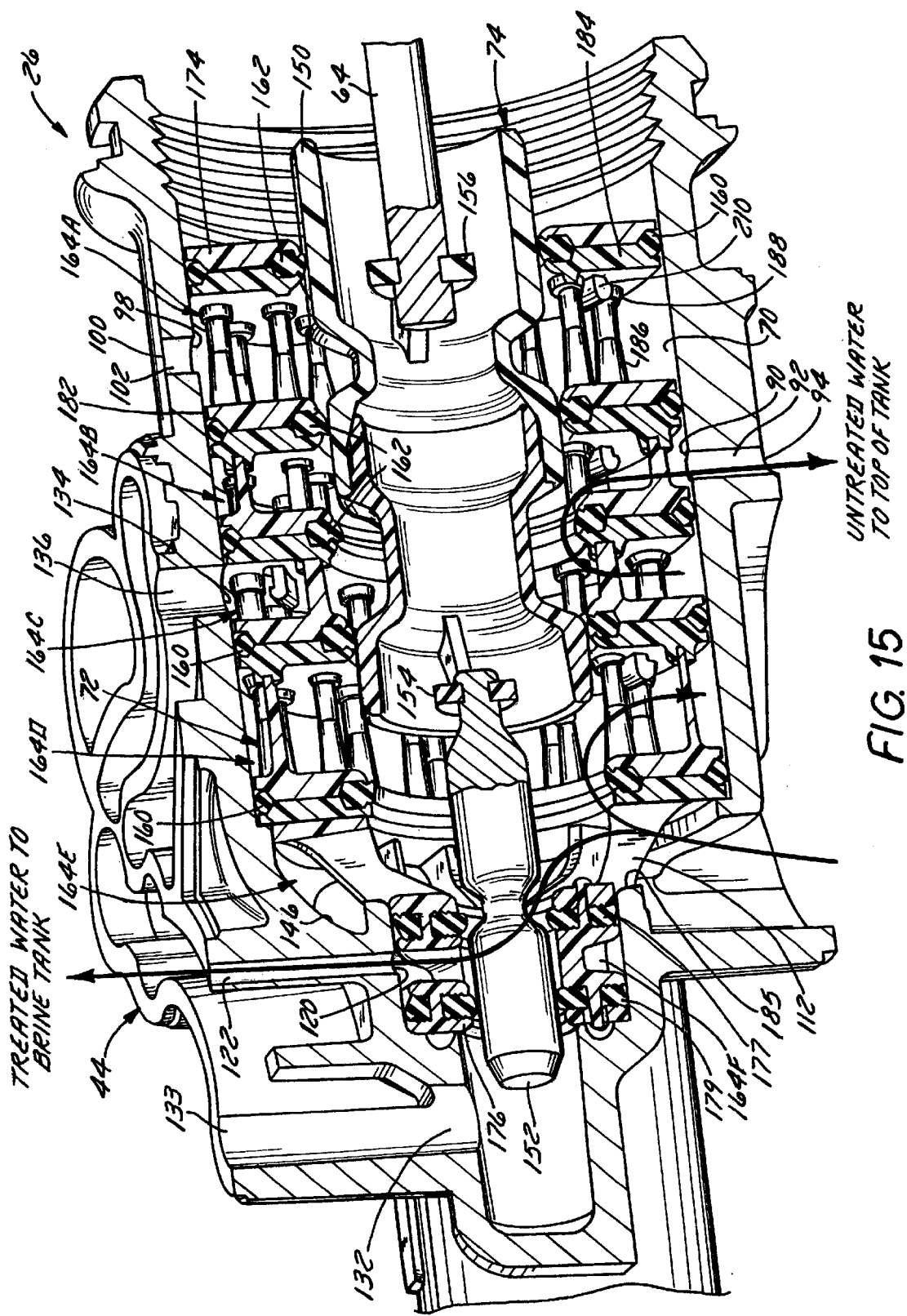

The valve 26 normally assumes the service position illustrated in FIG. 14, in which the untreated water inlet port 82 is connected to the top-of-tank port 90, and in which the distribution port 112 is connected to the service port 108. The brine port 120 is isolated from the other ports due to the sealing of both combined seals 177 and 179 against a first land on the brine portion 152 of the piston 74. In this configuration, water flows from the untreated water inlet port 82, through the resin tank 22, and to the service port 108 of the valve body 44, thereby treating the water by ion exchange.

A regeneration cycle is initiated when the system determines that the ion exchange capacity of the resin bed 36 will be exhausted in a designated period such as within the next day. This decision may be based on the time since the last regeneration cycle and/or sensed usage and/or other factors. To initiate a regeneration cycle, the motor (not shown) drives the rod 64 to the left as seen in the drawings from the service position illustrated in FIG. 14 to a fill position illustrated in FIG. 15. After this movement, the untreated water inlet port 82 remains in communication with the top-of-tank port 90, and the distribution port 112 is connected to both the service port 108 and the brine port 120. As a result, treated water flows both to the service port 108 and into the brine tank 24, thereby filling the brine tank 24 with treated water to dissolve some of the particles 38 in the brine tank 24 to form a regenerant solution 39. This operation is generally known as a "prefill" operation because the brine tank is filled within the regeneration cycle just before the regeneration phase. Alternatively, the brine tank could be filled in a "post fill" phase occurring as the last step of a regeneration cycle, thereby preparing the system for the next regeneration cycle.

Figure 16:
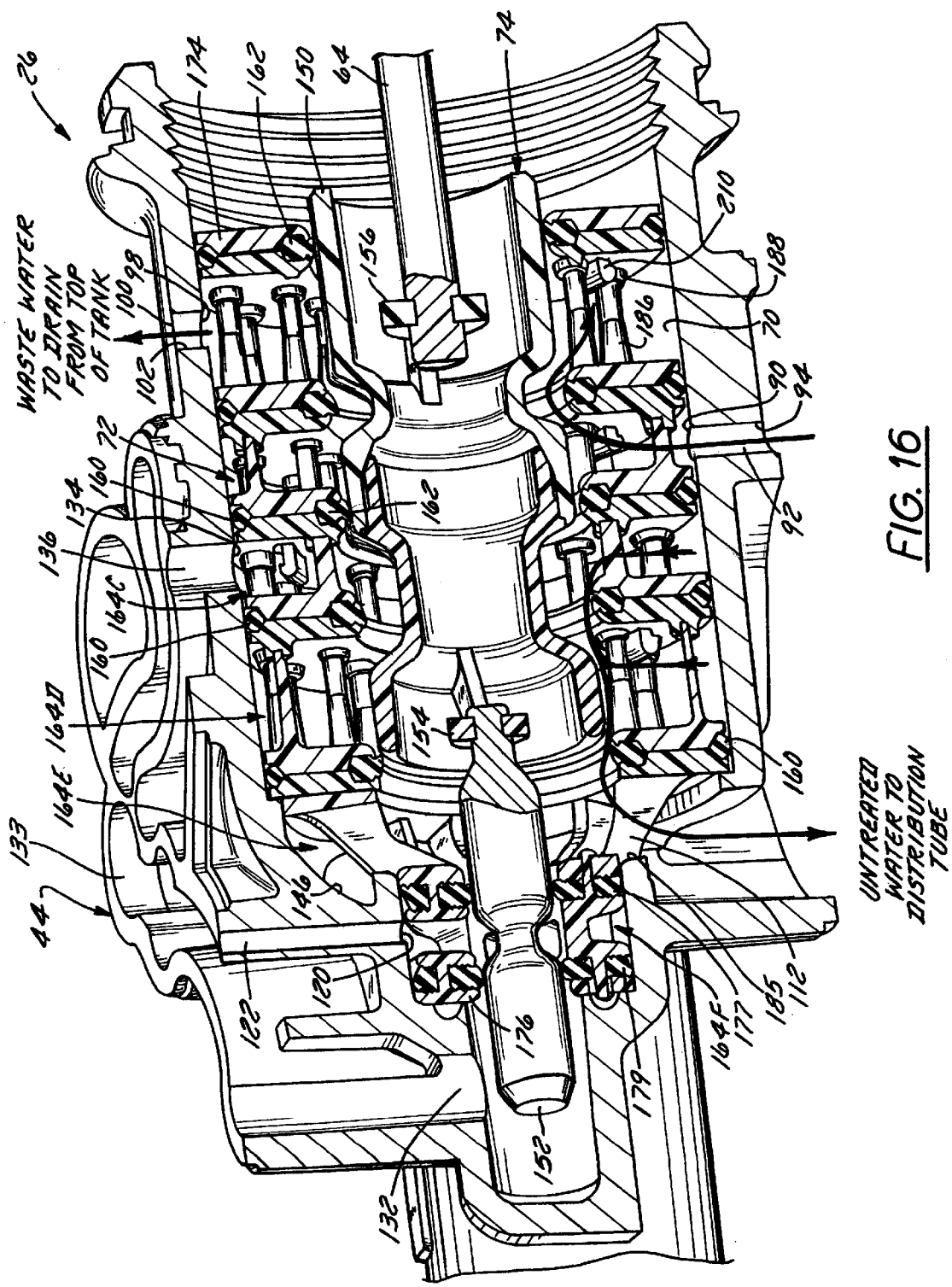

When the fill phase of the cycle is completed, the rod 64 drives the piston 74 axially to a backwash position illustrated in FIG. 16, in which the top-of-tank port 90 is connected to the drain port 98 and the untreated water inlet port 82 is connected to both the service port 108 and to the distribution port 112, thereby backwashing the resin tank 22 with untreated water while continuing to supply untreated water to the service outlet. This backwashing flushes trapped particulate matter from the resin bed 36, thereby facilitating subsequent fluid flow from the bed 36 and enhancing the bed's ability to treat the water.

Figure 17:
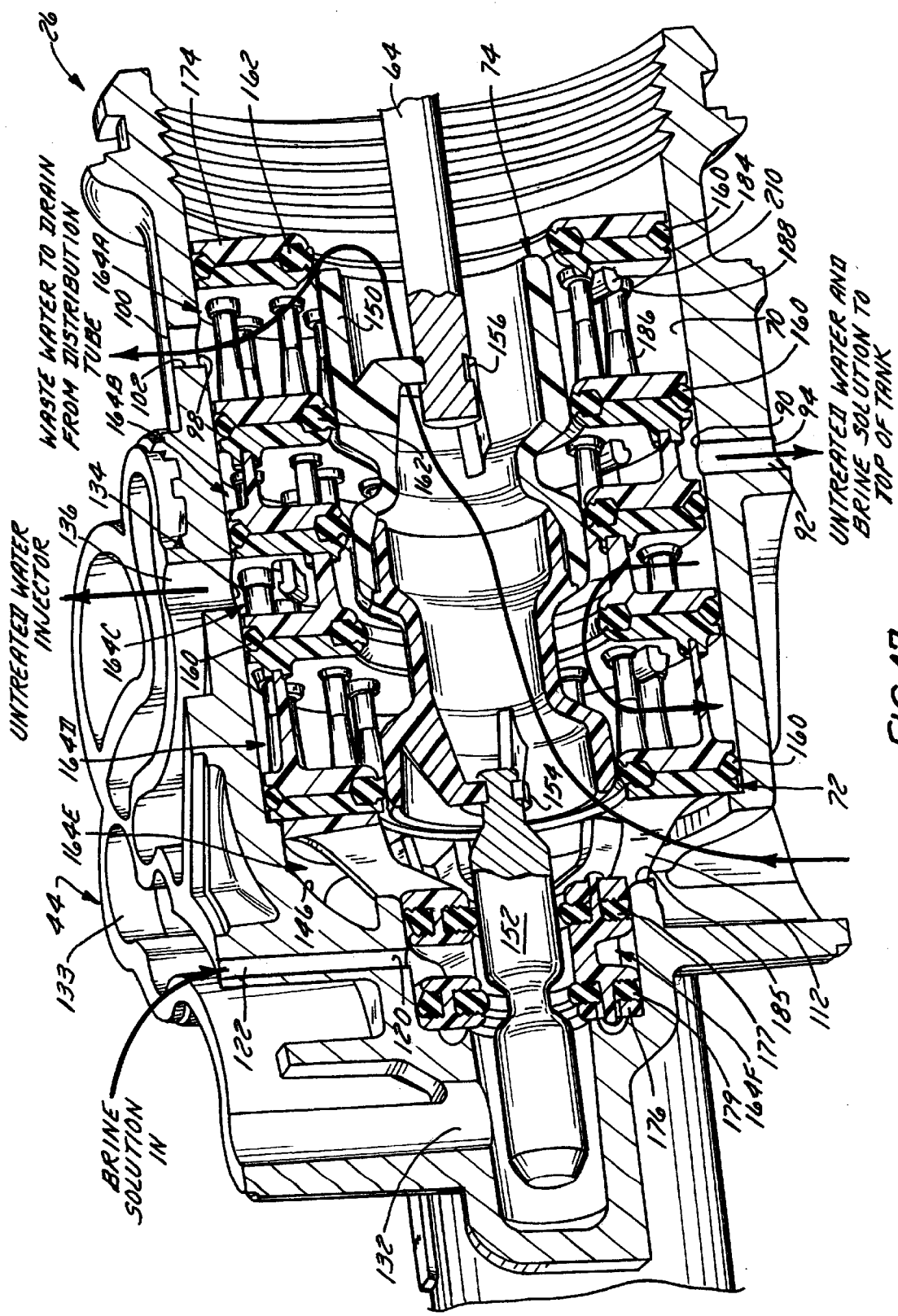

After the backwash phase, the rod 64 drives the piston 74 to a regeneration position illustrated in FIG. 17, in which the inlet port 82 is connected to the service port 108, the brine port 120 is connected to the top-of-tank port 90 via the injector 66, and the distribution port 112 is connected to the drain port 98. In this position, the water flowing into the injector 66 from the untreated water inlet port 82 siphons a regenerant solution 39 from the brine tank 24 and forces it through the resin bed 36 from above and to drain, thereby flushing the resin tank 22 with the regenerant solution 39 to regenerate the resin bed or other treatment medium by replacing the objectionable ions such as calcium ions in the exhausted resin bed 36 with less objectionable ions such as sodium ions. As discussed above, this operation is called downflow regeneration because the regenerant solution enters the resin tank 22 from the top and is drawn out via the distribution tube 42. Alternatively, if the valve 26 were to be configured for upflow regeneration, the plug 142 and the injector 66 would be substituted for one another, thereby connecting the brine port 120 to the distribution port 112. The regenerant solution 39 would then flow into the bottom of the resin tank 22 from the bottom of the distribution tube 42 and would exit the top of the resin tank 22 and flow to drain.

Figure 18:
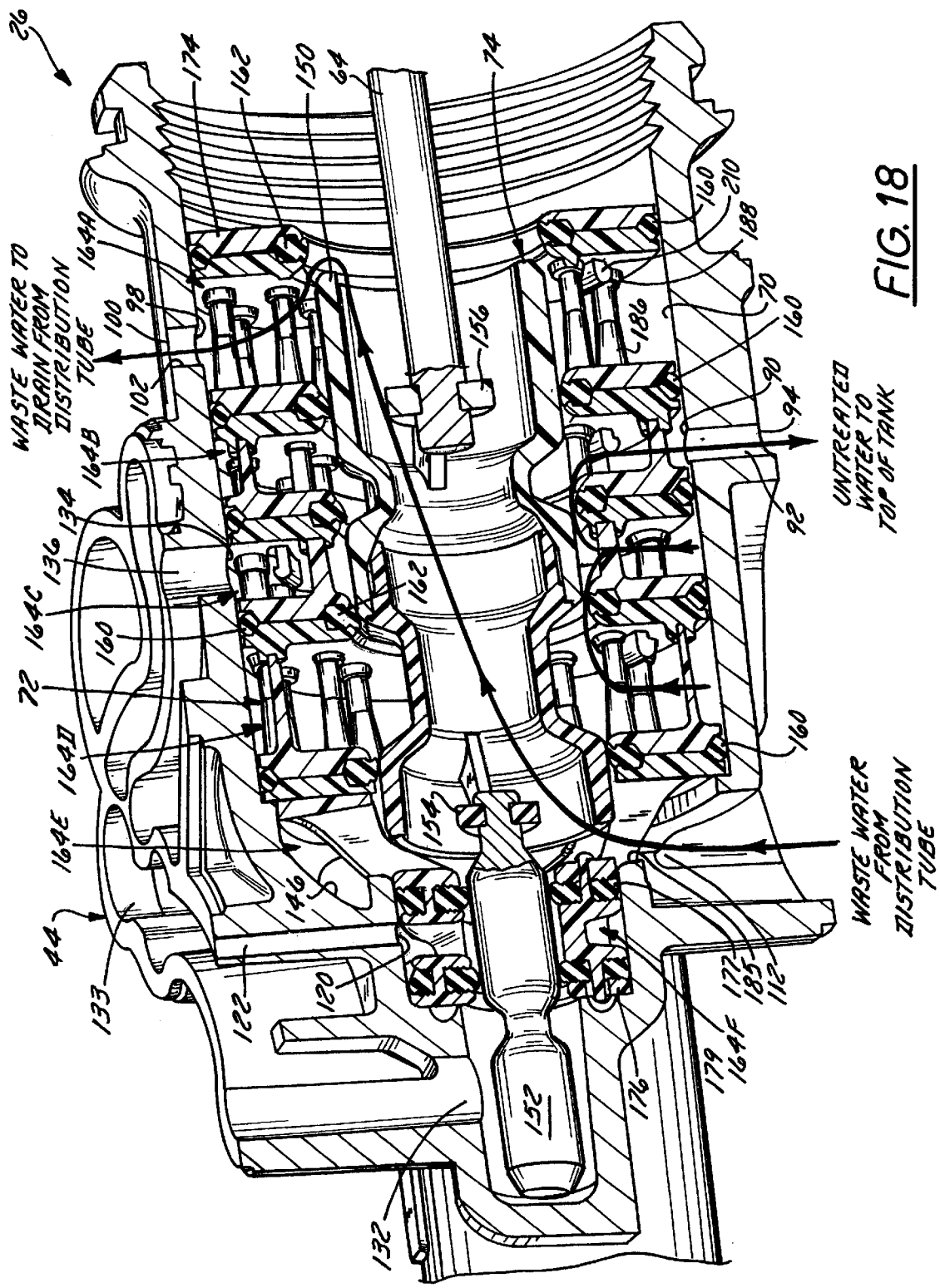

After the regeneration phase of the cycle is complete, the rod 64 drives the piston 74 to the fast rinse position seen in FIG. 18 in which the untreated water inlet port 82 is connected to the service port 108 and the top-of-tank port 90 and in which the distribution port 82 is connected to the drain port 98, thereby rinsing the resin tank 22 with untreated water to remove the regenerant solution 39 from the resin tank 22. The resin bed 36 is now fully-regenerated and ready to resume water treatment. The drive rod 64 then returns the piston 74 to the service position illustrated in FIG. 14 to resume normal operation of the water softener.

The above-described cycle is only exemplary of the cycles performable using the valve 26. In actuality, the valve 26 could be controlled to skip operation(s) in the cycle, to perform the stated operations in different orders, and/or to repeat operation(s). Many other changes and modifications may be made within the scope of the present invention without departing from the spirit thereof. For instance, as discussed above, each set of static and dynamic seals 162 and 160 could be combined as a unitary element in which the inner and outer sealing elements are connected to one another. The invention is also usable in water treatment systems other than water softeners such as a backwashing filter control valve. The scope of these and other changes will become more readily apparent from a reading of the appended claims.

I claim:

1. A water treatment system control valve comprising:
   (A) a valve body which has (1) an internal bore, (2) external ports configured for connection to a source of untreated water, a treated water outlet, a brine tank, a drain, and a resin tank, respectively, (3) a plurality of internal ports opening into said internal bore, and (4) a plurality of passages connecting various ones of said internal ports to various ones of said external ports;
   (B) a piston which is axially slidable in said bore to connect various ones of said internal ports to one another in combinations that vary depending upon the position of said piston in said bore; and
   (C) a seal stack which is disposed in said bore and which sealingly surrounds said piston, said seal stack including
      (1) a plurality of spacers, each of which has inner and outer axial ends and inner and outer radial peripheries,
      (2) a plurality of elastomeric static seals, each of which is disposed between two adjacent spacers and which seals against a peripheral surface of said bore, and
      (3) a plurality of dynamic seals, each of which is disposed between two adjacent spacers and which seals against said piston, wherein at least some of said spacers are connected to adjacent spacers by lost motion connections that permit limited axial movement therebetween.

2. A water treatment system control valve as recited in claim 1, wherein each of said lost motion connections comprises a plurality of connectors extending axially from an associated spacer and operating to engage a mating receptacle in the adjacent spacer.

3. A water treatment system control valve as recited in claim 2, wherein each connector comprises a hook extending axially from one of said spacers, each of said hooks having a leg which is substantially longer than a depth of the associated receptacle.

4. A water treatment system control valve as recited in claim 3, wherein each of said receptacles comprises an arcuate slot formed in an axial end face of the adjacent spacer, each of said slots having a receptacle portion and a latching portion that is of a reduced radial width when compared to that of the receptacle portion.

5. A water treatment system control valve as recited in claim 4, wherein each of said slots has a detent at an inner radial periphery thereof that hinders unintended disassembly of said seal stack.

6. A water treatment system control valve as recited in claim 1, wherein each of said static seals are clamped between two adjacent spacers so as to compress axially and expand radially when said adjacent spacers are forced toward one another.

7. A water treatment system control valve as recited in claim 6, wherein said seal stack is held in said bore by a cap which engages and compresses said seal stack to compress said static seals axially and expand said static seals radially, thereby improving sealing contact between said static seals and said peripheral surface of said bore.

8. A water treatment system control valve as recited in claim 1, wherein each of said spacers comprises a pair of annular rings connected to one another by axially-extending posts.

9. A water treatment system control valve as recited in claim 8, wherein said spacers are formed from an injection-molded plastic, and wherein said posts are injected onto an axial surface of one of said annular rings and are affixed to tubular receptacles injected onto a facing axial surface of the other of said annular rings.

10. A water treatment system control valve as recited in claim 1, wherein each of said static seals is clamped and sealed between a pair of outer seal grooves formed in axial end faces of the associated adjacent spacers so as to expand radially against a peripheral surface of the bore.

11. A water treatment system control valve as recited in claim 10, wherein each of said outer seal grooves has facing endwalls that are tapered relative to a radial plane.

12. A water treatment system control valve as recited in claim 11, wherein one endwall of each of said outer seal grooves is tapered more severely than the other endwall.

13. A water treatment system control valve as recited in claim 12, wherein one of said endwalls of each outer seal groove is tapered at an angle of more than 40°, and the other endwall is tapered at an angle of less than 40°.

14. A water treatment system control valve as recited in claim 1, wherein each of said dynamic seals is clamped in an inner seal groove formed by adjacent axial end faces of the associated facing spacers, and wherein each of said inner seal grooves has annular ribs that engage the associated dynamic seal to help hold the associated dynamic seal in place against said inner seal groove.

15. A water treatment system control valve as recited in claim 1, wherein said piston has a plurality of lands separated axially from one another by grooves, and wherein said dynamic seals seal against said lands but are spaced from said grooves to form flow paths radially between said dynamic seals and the peripheries of said grooves.

16. A water treatment system control valve as recited in claim 1, further comprising a timer-operated controller which drives said piston to move axially relative to said bore.

17. A water treatment system control valve as recited in claim 1, wherein some of said spacers have a reduced axial length when compared to others of said spacers.

18. A water treatment system control valve as recited in claim 1, wherein said valve body has two external ports which are configured for connection to the resin tank, one of which is configured to open into the top of said resin tank and the other of which is configured for connection to a distribution tube extending downwardly into said resin tank.

19. A water treatment system control valve as recited in claim 1, wherein each of the static seals is axially aligned with a corresponding dynamic seal and is separated from the corresponding dynamic seal.

20. A water treatment system control valve as recited in claim 1, wherein each of the static seals is axially aligned with a corresponding dynamic seal and is formed integrally with the corresponding dynamic seal.

21. A water treatment system control valve comprising:
(A) a valve body which has (1) an internal bore, (2) external ports configured for connection to at least a source of untreated water, a treated water outlet, a brine line, a drain, and a resin tank, respectively, (3) a plurality of internal ports opening into said internal bore, and (4) a plurality of passages connecting various ones of said internal ports to various ones of said external ports;
(B) a piston which is axially slidable in said bore under the action of a controller to connect various ones of said internal ports to one another in combinations that vary depending upon the position of said valve piston in said bore; and
(C) a seal stack which is disposed in said bore and which surrounds said piston, said seal stack including a plurality of elastomeric static seals which seal against a peripheral surface of said bore and a plurality of dynamic seals which are disposed radially inwardly of said static seals and which seal against said piston, wherein said seal stack is dimensioned and configured such that (1) said seal stack is compressible axially upon valve assembly to expand said static seals radially to enhance sealing contact between said static seals and said peripheral surface of said bore, and (2) upon initial removal of said seal stack axially from said bore, said seal stack expands axially to permit said static seals to constrict radially to diminish sealing contact between said static seals and said peripheral surface of said bore, thereby releasing said static seals from said peripheral surface of said bore and facilitating further removal of said seal stack from said bore.

22. A water treatment system control valve as recited in claim 21, wherein each of said static seals is clamped and sealed between two spacers of said seal stack that are connected to one another so as to permit limited relative axial movement therebetween, and wherein said seal stack is configured such that said spacers move apart sequentially when said seal stack is removed from said bore by pulling an outermost spacer of said stack axially outwardly, and wherein, as a result of said sequential movement, said static seals release sequentially as each successive spacer initial moves outwardly relative to said valve body.

23. A water treatment system comprising:
(A) a brine tank;
(B) a resin tank containing a treatment medium; and
(C) a water softener control valve including
(1) a valve body which has (a) an internal bore, (b) external ports configured for connection to a source of untreated water, a service line, said brine tank, a drain, and said resin tank, respectively, (c) a plurality of internal ports opening into said internal bore, and (d) a plurality of passages connecting various ones of said internal ports to various ones of said external ports;
(2) a piston which is axially slidable in said bore to connect various ones of said internal ports to one another in combinations that vary depending upon the position of said piston in said bore; and
(3) a seal stack which is disposed in said bore and which surrounds said piston, said seal stack including (a) a plurality of spacers, each of which has inner and outer axial ends and inner and outer radial peripheries, (b) a plurality of elastomeric static seals, each of which is disposed between two adjacent spacers and which seals against a peripheral surface of said bore, and (c) a plurality of dynamic seals, each of which is disposed between two adjacent spacers and which seals against said piston, wherein each of said spacers is connected to an adjacent spacer by a lost motion connection that permits limited axial movement therebetween.

24. A water treatment system as recited in claim 23, wherein each of said static seals is clamped and sealed between two adjacent spacers so as to compress axially and expand radially against the peripheral surface of said bore when said adjacent spacers are forced toward one another.

25. A water treatment system as recited in claim 23, wherein said seal stack is held in said bore by a cap which engages and compresses said seal stack to compress said static seals axially and expand said static seals radially against said peripheral surface of said bore.

26. A water treatment system as recited in claim 23, wherein said valve body has two external ports which are configured for connection to said resin tank, one of which is configured to open into the top of said resin tank and the other of which is configured for connection to a distribution tube extending downwardly into said resin tank.

27. A seal stack configured for use with a valve body including a piston slidable within a bore, said seal stack comprising:
(A) a plurality of spacers, each of which has inner and outer axial ends and inner and outer radial peripheries;
(B) a plurality of elastomeric static seals, each of which is disposed between two adjacent spacers and which is configured to seal against a peripheral surface of said bore, and
(C) a plurality of dynamic seals, each of which is disposed between two adjacent spacers and which is configured to seal against said piston, wherein at least some of said spacers are connected to adjacent spacers by lost motion connections that permits limited axial movement therebetween and axial compression of said seal stack when said seal stack is assembled into said bore, and wherein each of said static seals compresses axially and expands radially upon axial compression of said seal stack.

28. A seal stack as recited in claim 27, wherein each of said lost motion connections comprises a plurality of connectors, each of which comprises a hook extending axially from one of said spacers and to a receptacle on the adjacent spacer.

29. A seal stack as recited in claim 28, wherein each of said receptacles comprises an arcuate slot formed in an axial end face of the adjacent spacer, each of said slots having a receptacle portion and a latching portion that is of a reduced radial width when compared to that of the receptacle portion.

30. A seal stack as recited in claim 29, wherein each of said slots has a detent at an inner radial periphery thereof that hinders unintended disassembly of said seal stack.

31. A seal stack as recited in claim 29, wherein each of said spacers comprises a pair of annular rings connected to one another by axially-extending posts.

32. A seal stack as recited in claim 31, wherein said spacers are formed from an injection-molded plastic, and wherein said posts are injected onto an axial surface of one of said annular rings and are affixed to tubular receptacles injected onto a facing axial surface of the other of said annular rings.

33. A seal stack as recited in claim 27, wherein each of said static seals is clamped in a seal groove formed between axial end faces of the associated adjacent spacers, and wherein walls of each of said seal grooves are tapered relative to a radial plane.

34. A seal stack as recited in claim 33, wherein one of the walls of each of said seal grooves is tapered more severely than the other wall.

35. A seal stack as recited in claim 27, wherein each of said dynamic seals is clamped and sealed in a seal groove formed by the axial end faces of the associated adjacent spacers, and wherein the walls of each of said seal grooves have annular ribs that engage the associated dynamic seal to help hold the associated dynamic seal in place.

\* \* \* \* \*